June 27, 1944.  C. M. FRIDEN  2,352,376
CALCULATING MACHINE
Filed May 19, 1942   14 Sheets-Sheet 1
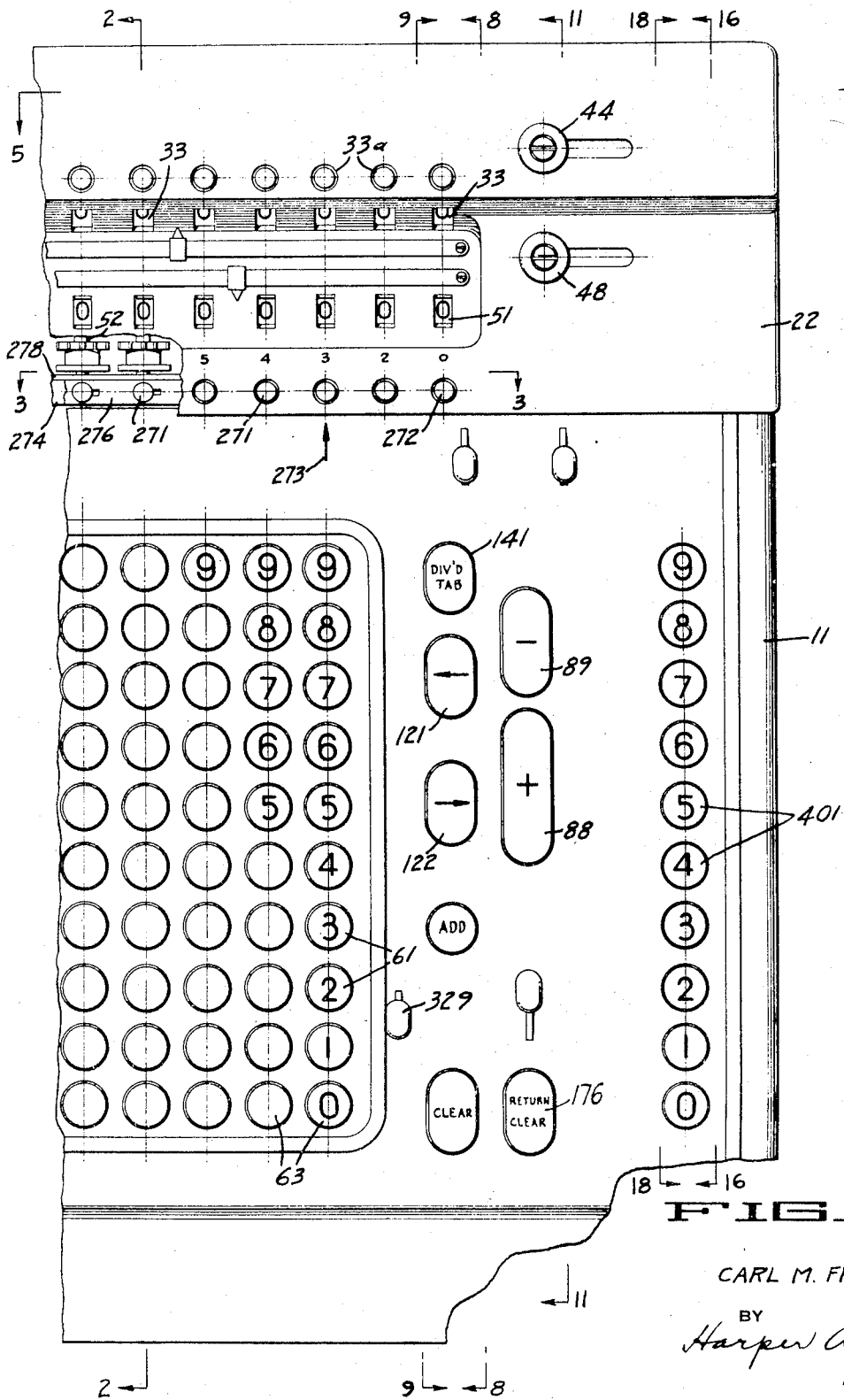
FIG_1_
INVENTOR
CARL M. FRIDEN
BY
Harper Allen
ATTORNEY

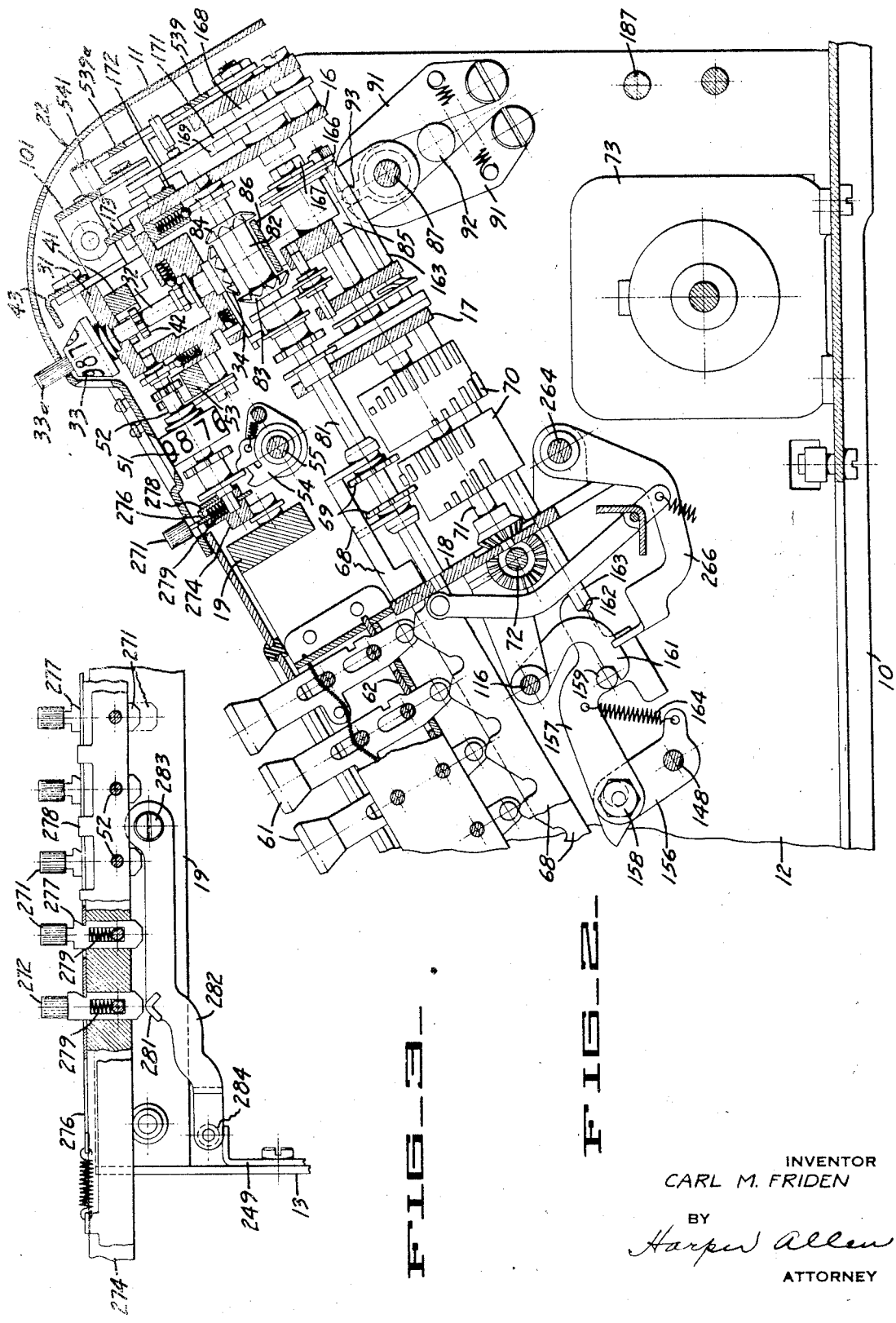

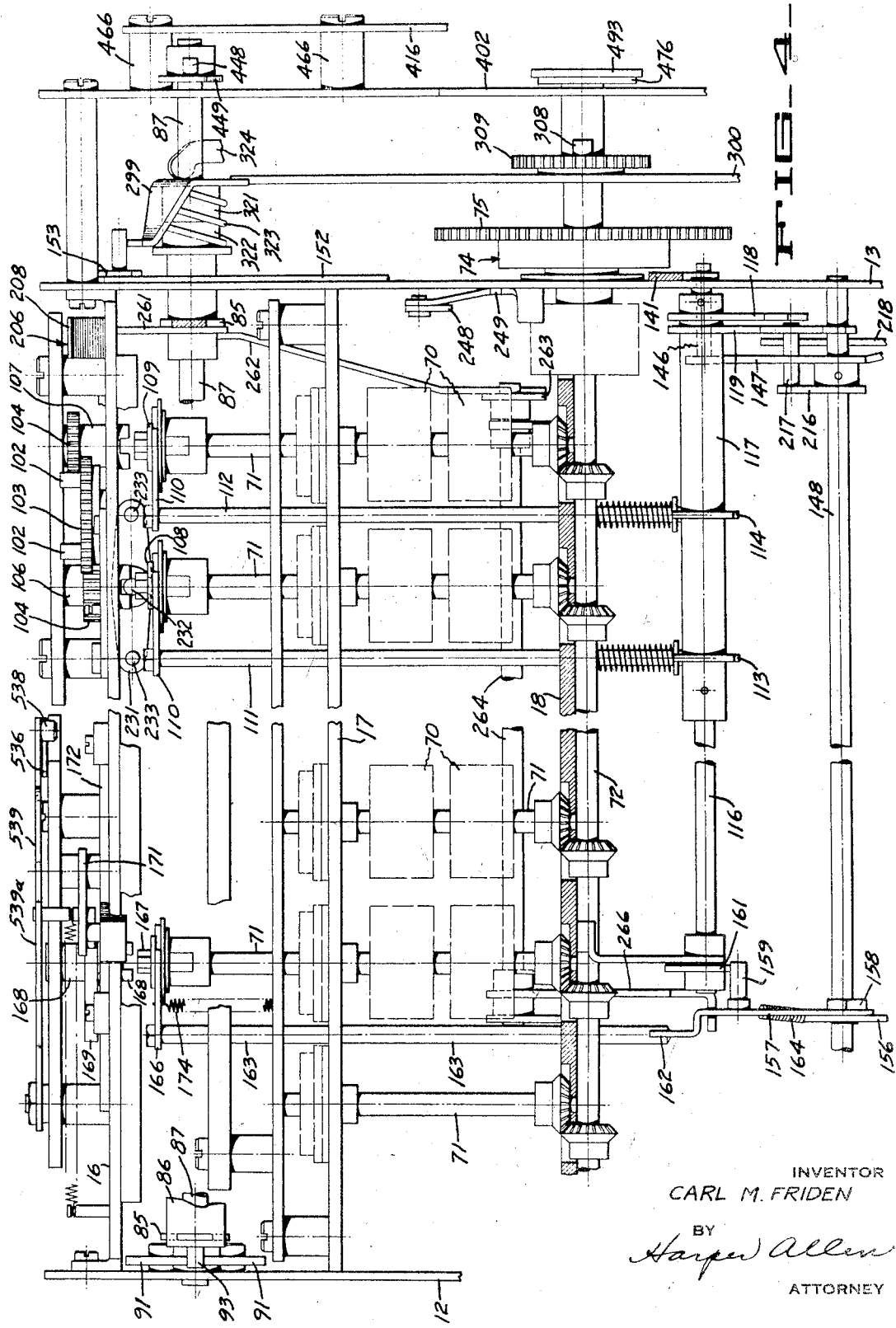

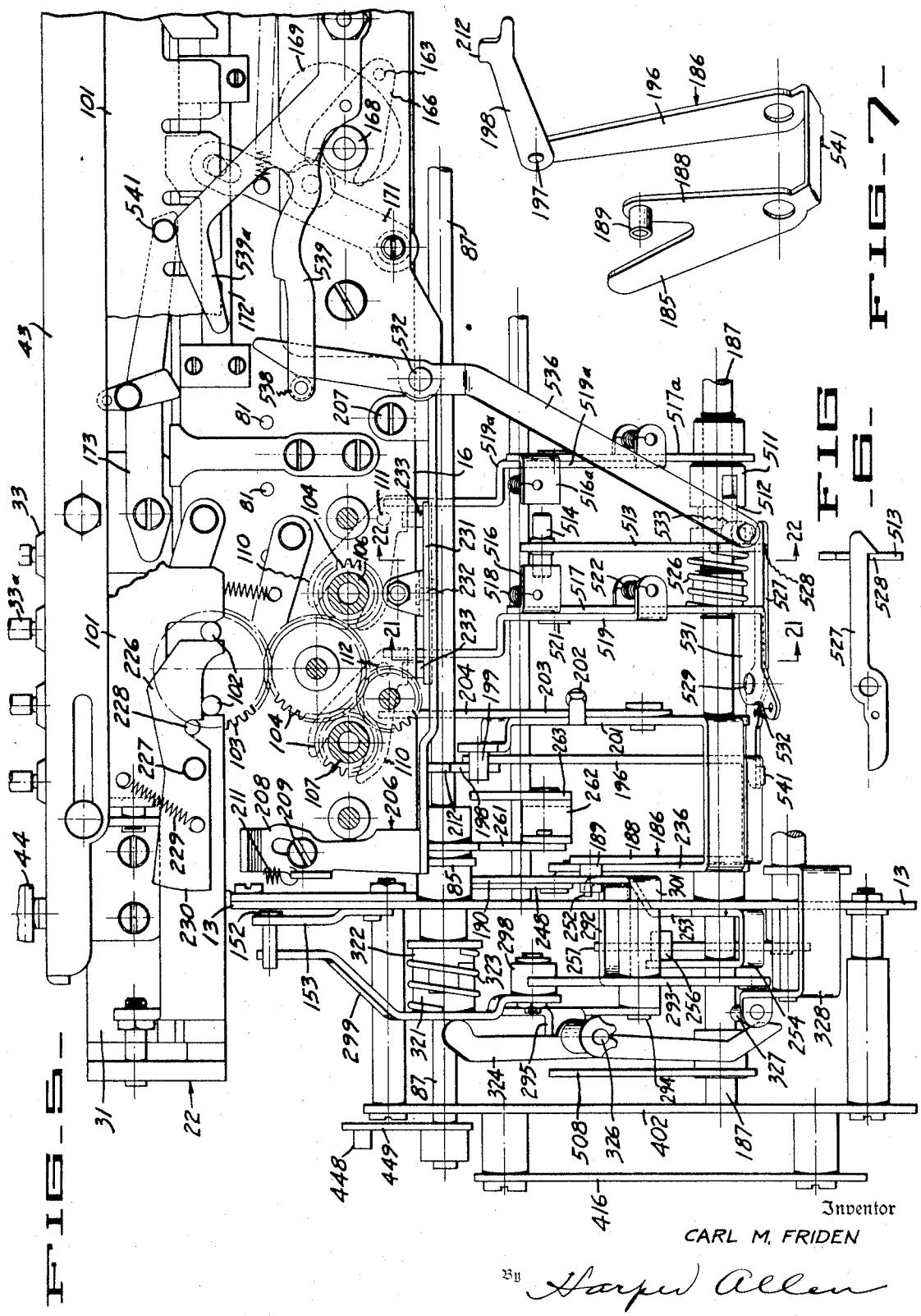

June 27, 1944.  C. M. FRIDEN  2,352,376
CALCULATING MACHINE
Filed May 19, 1942  14 Sheets-Sheet 5
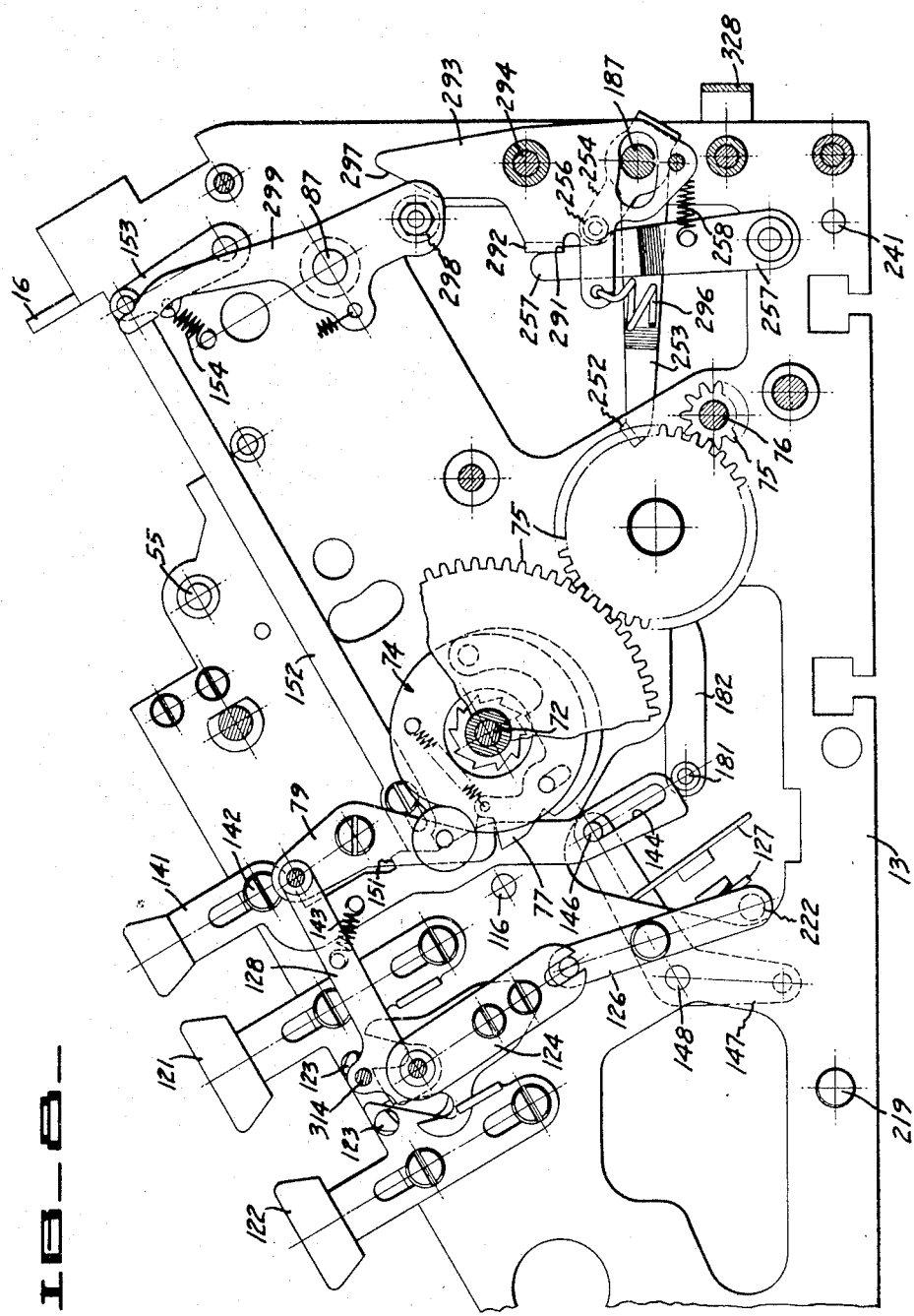
INVENTOR
CARL M. FRIDEN
BY
Harper Allen
ATTORNEY

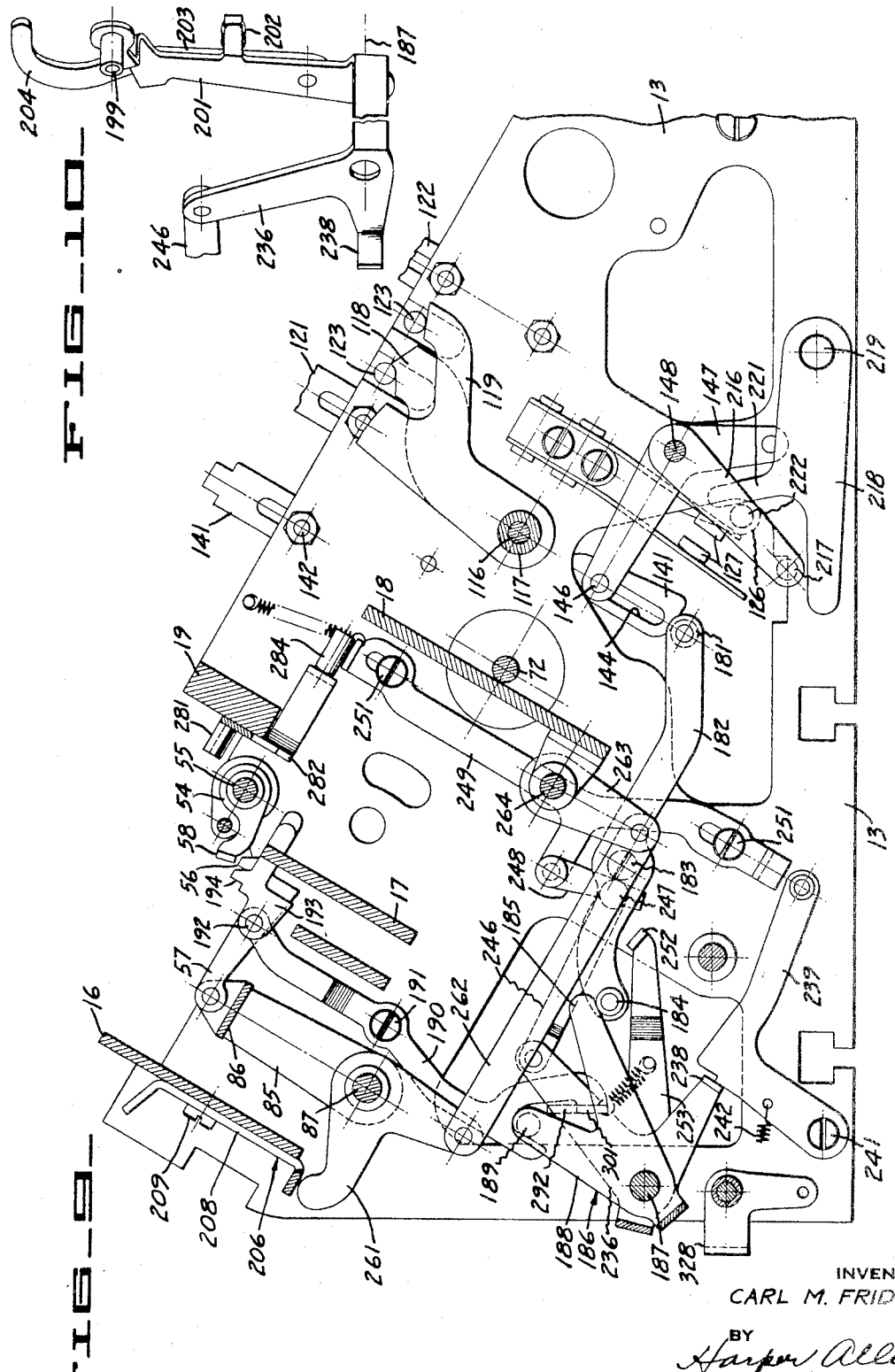

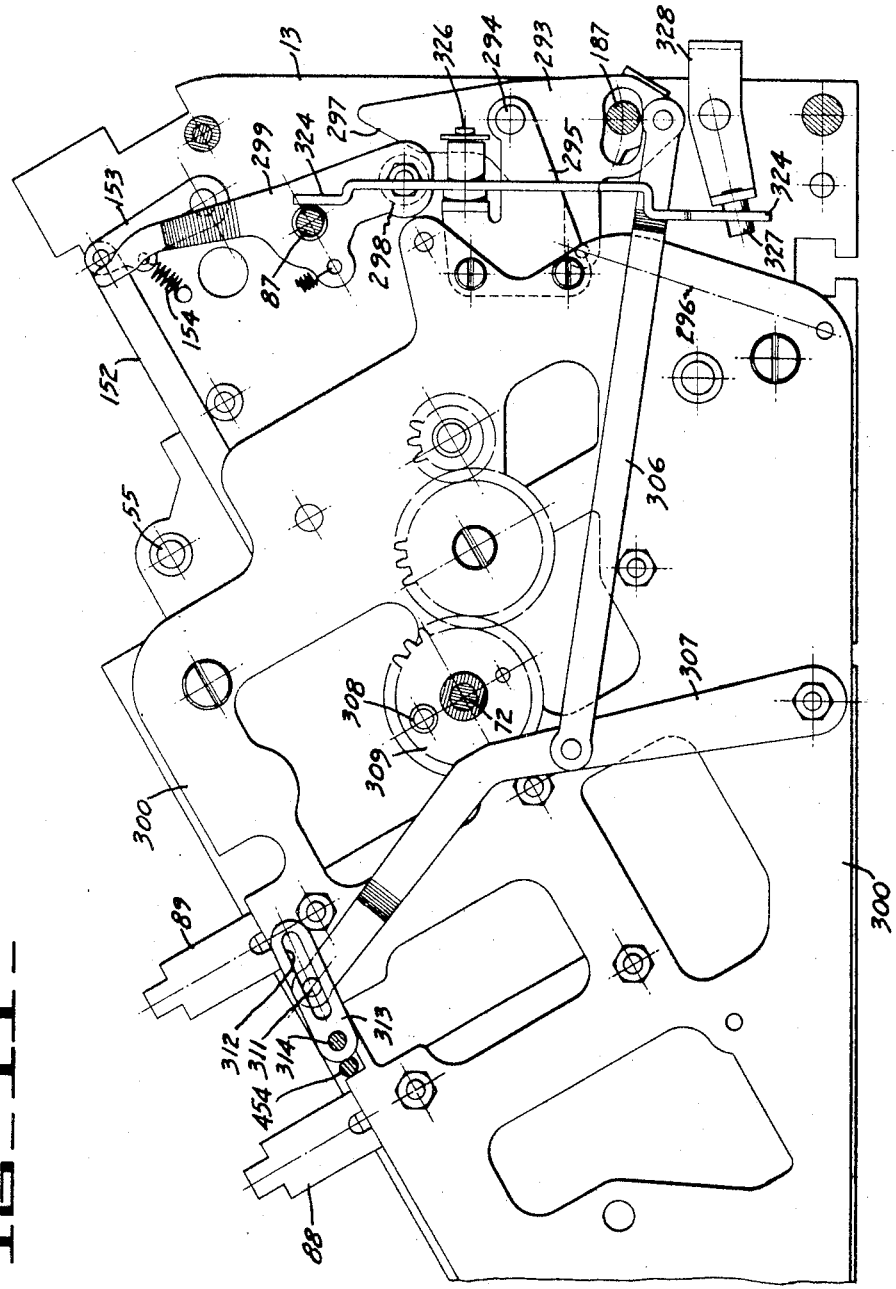

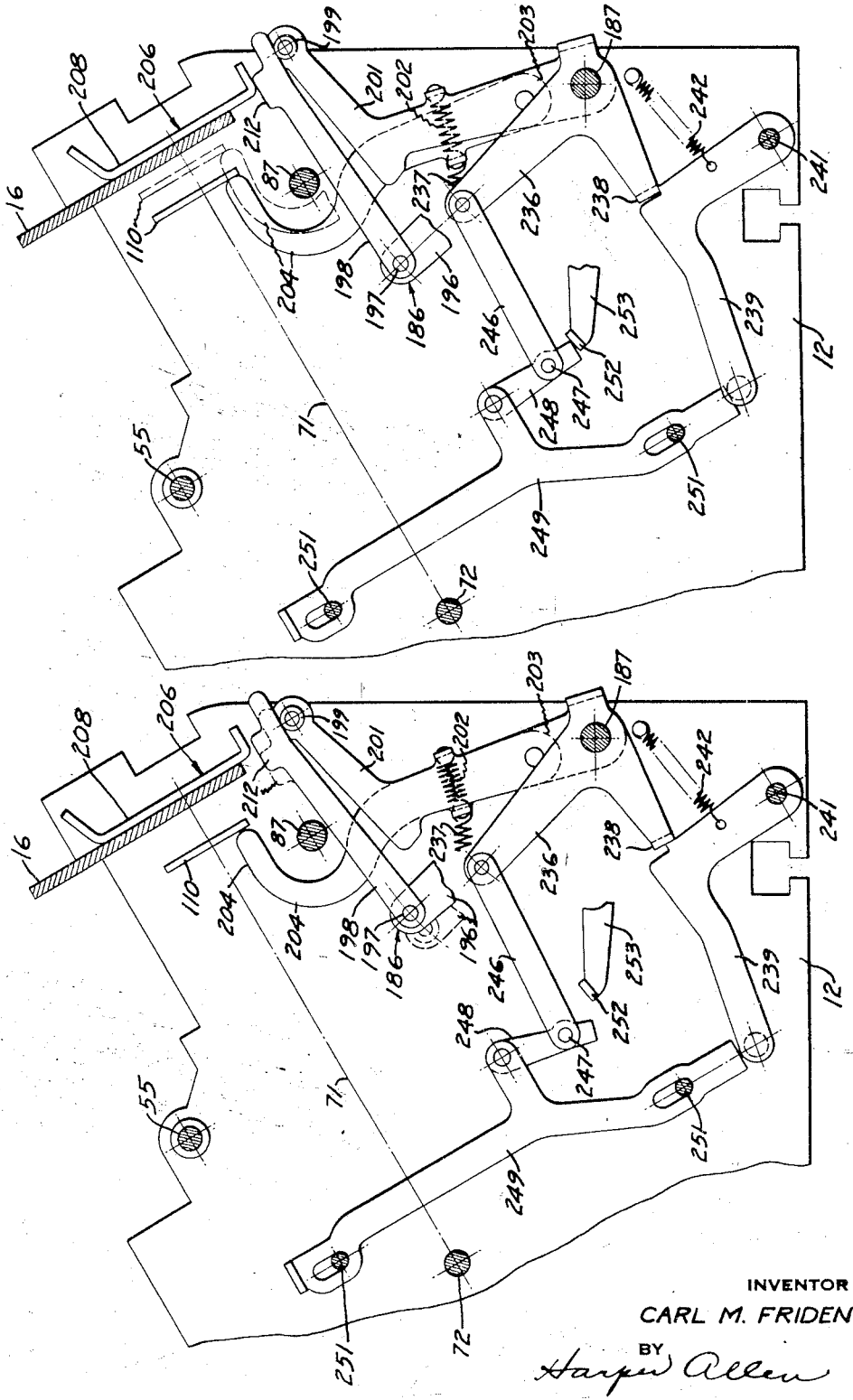

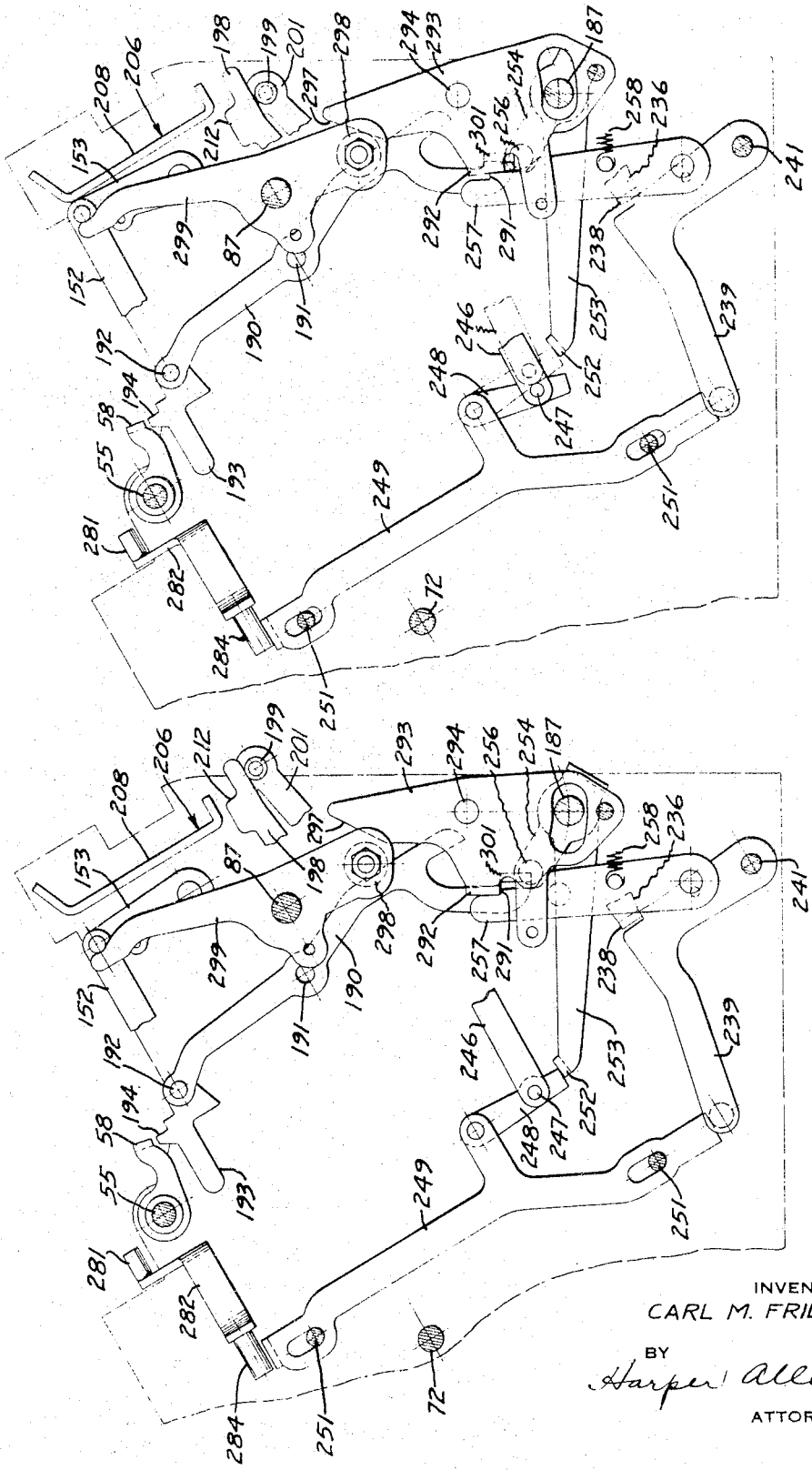

June 27, 1944.    C. M. FRIDEN    2,352,376
CALCULATING MACHINE
Filed May 19, 1942    14 Sheets-Sheet 10
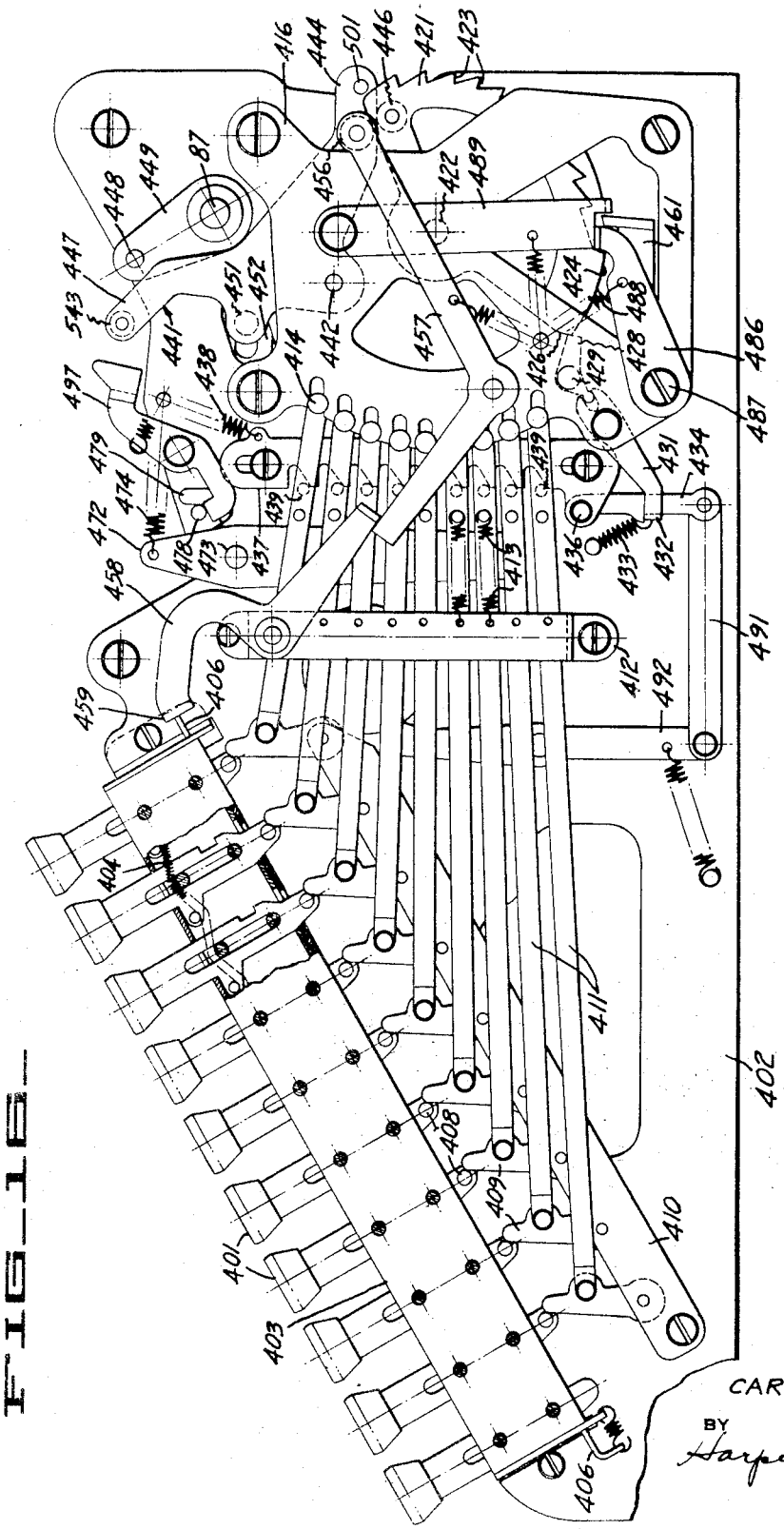
INVENTOR
CARL M. FRIDEN
BY
Harper Allen
ATTORNEY

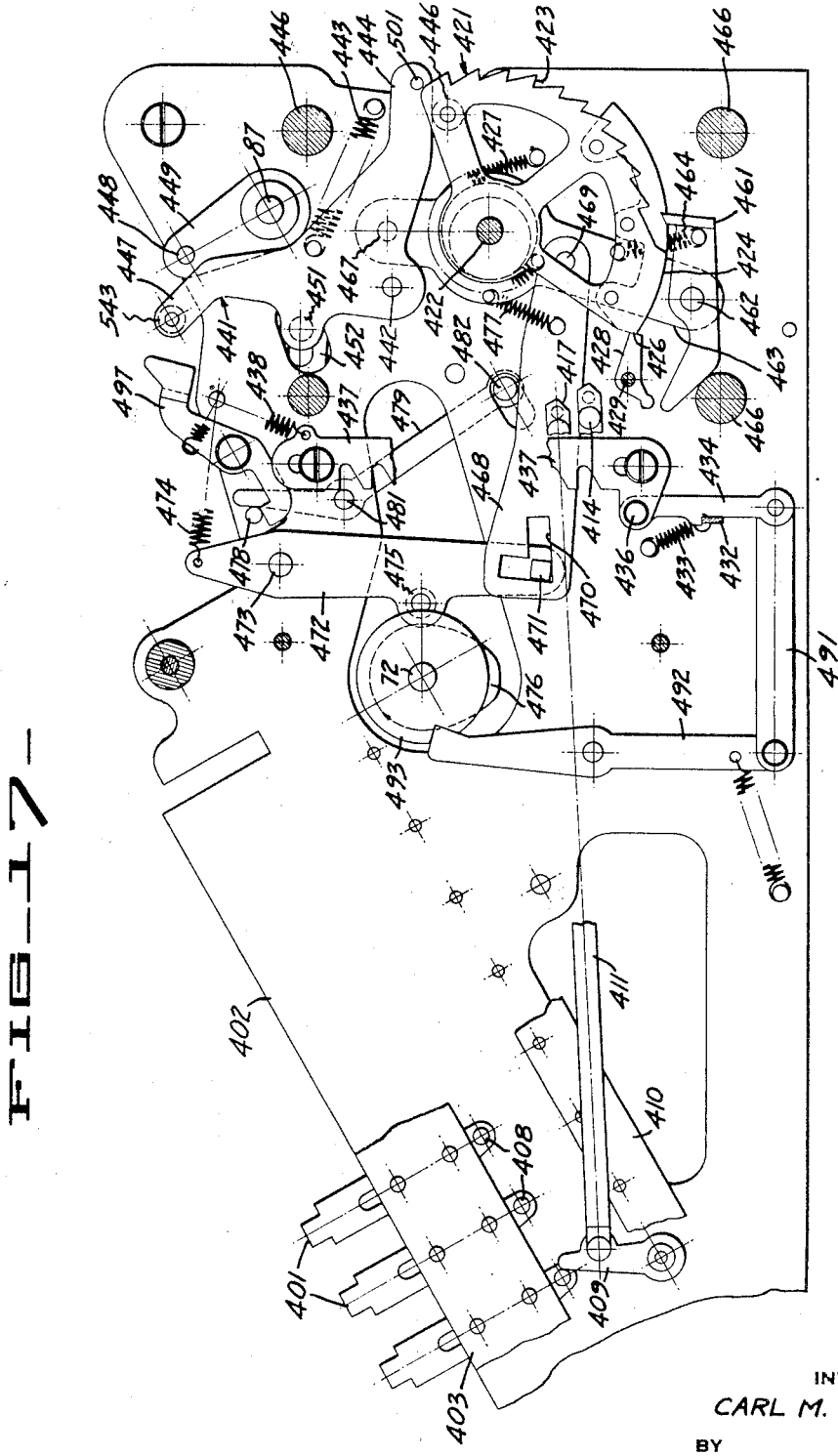

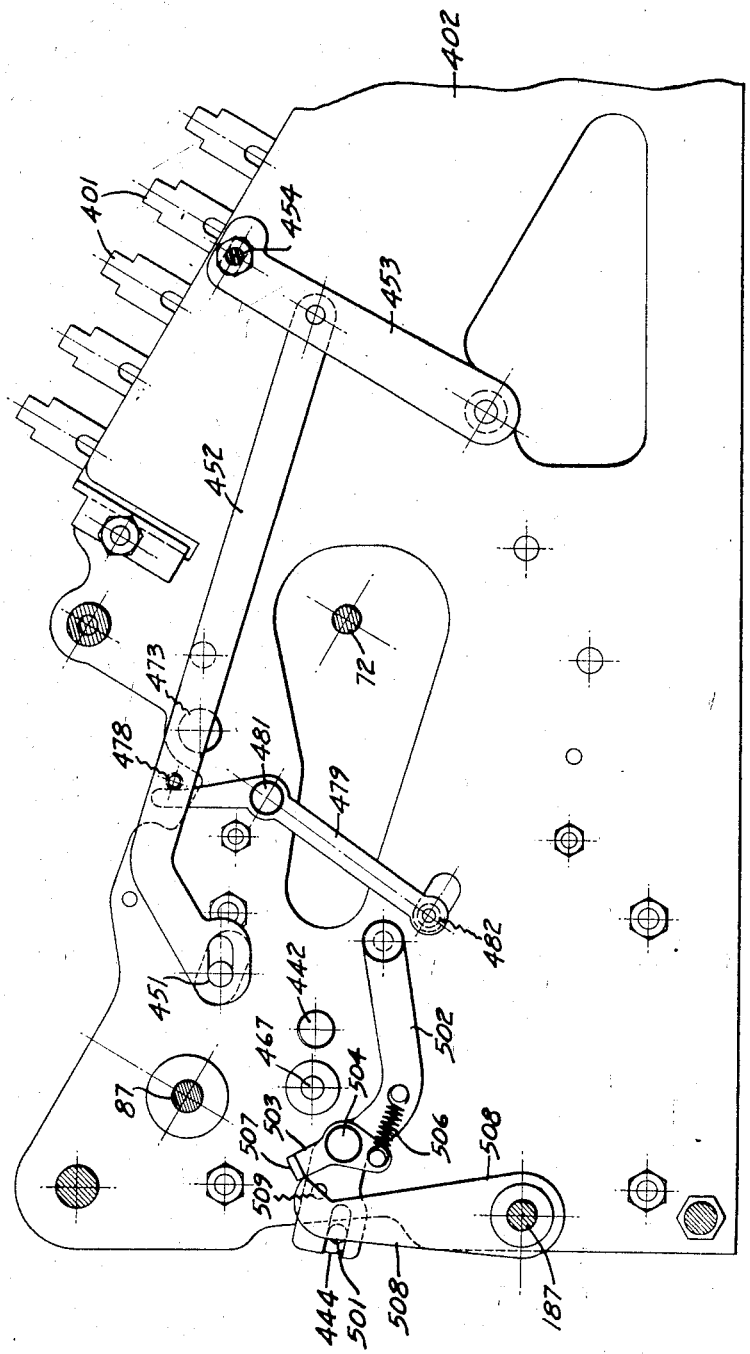

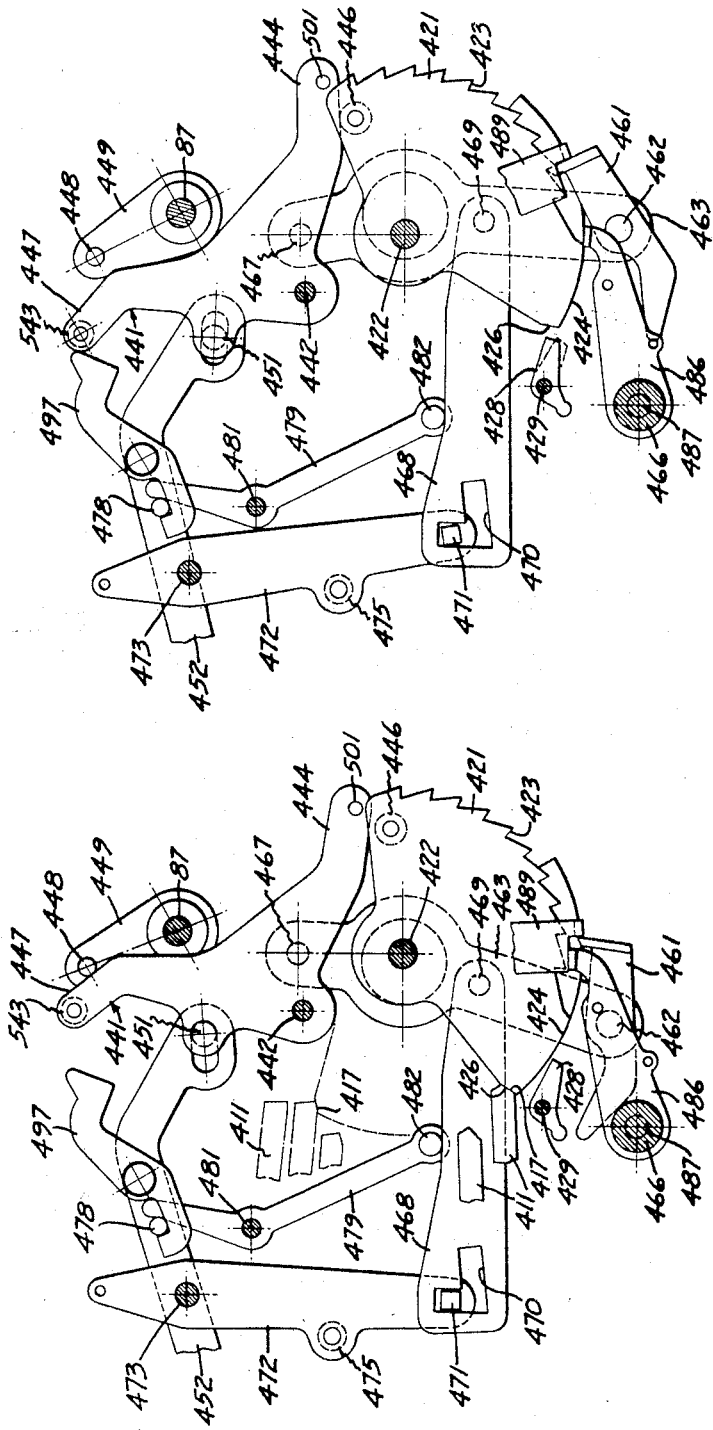

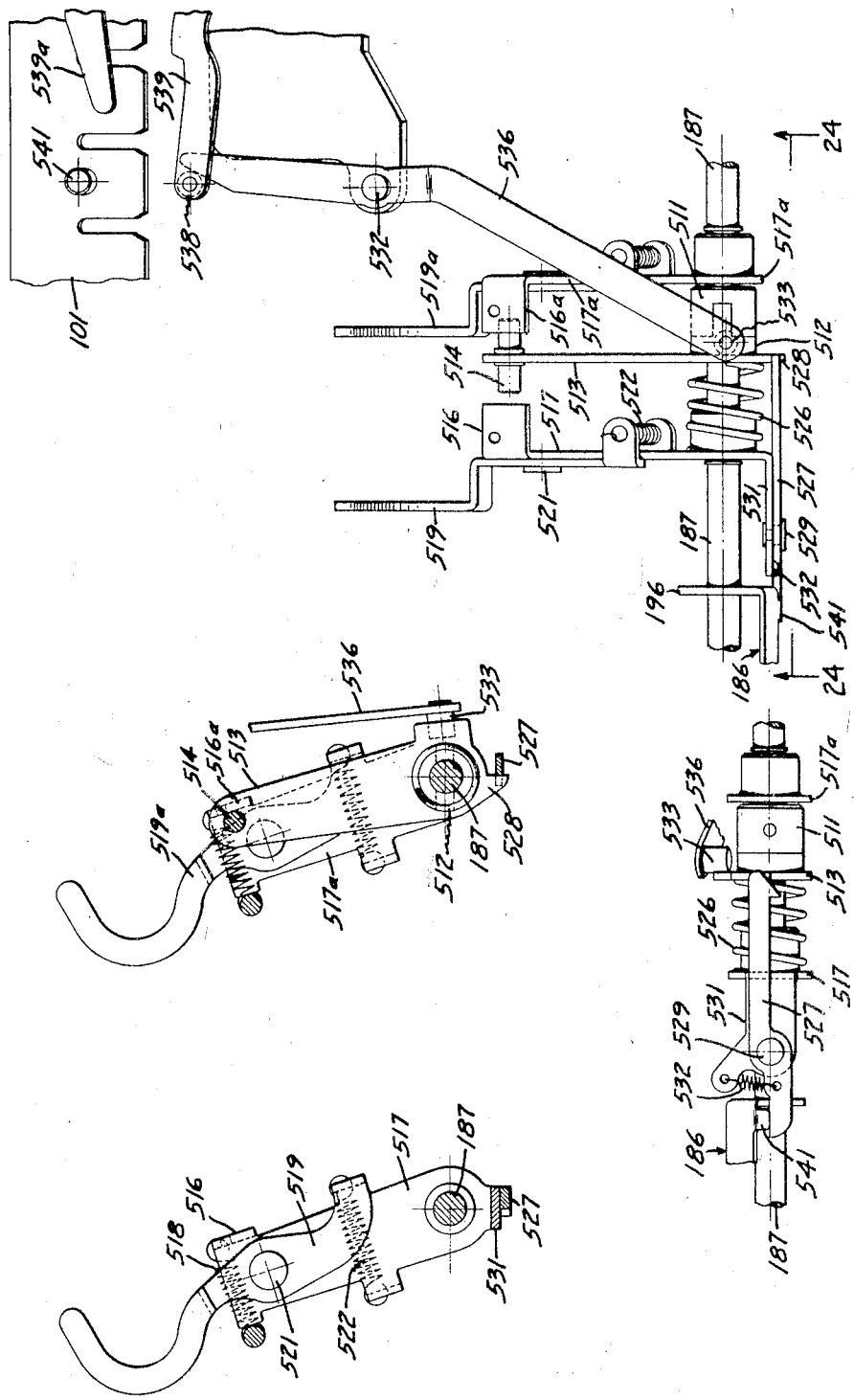

Patented June 27, 1944

2,352,376

UNITED STATES PATENT OFFICE 2,352,376

CALCULATING MACHINE

Carl M. Friden, Pleasanton, Calif., assignor to Friden Calculating Machine Co., Inc., a corporation of California Application May 19, 1942, Serial No. 443,549

4 Claims. (Cl. 235—63)

This invention relates to calculating machines of the character adapted to perform addition, subtraction, multiplication and division, and is concerned more particularly with the provision of improved means for controlling shifting of the carriage in multiplying operations.

It is a general object of the invention to provide improved means for controlling carriage shifting in multiplying operations.

Another object of the invention is to provide an improved control mechanism for a multiplying calculator in which the initial positioning of the carriage to start the multiplying operation controls the direction of shifting of the carriage during the multiplying operation.

Other objects and advantages of the invention will be apparent from the following description of a preferred embodiment, as illustrated in the accompanying drawings, in which:

Figure 1 is a fragmentary plan view of a calculating machine embodying the invention;

Figure 2 is a longitudinal sectional elevation of the rear portion of the machine taken as indicated by the line 2—2 in Figure 1;

Figure 3 is a fragmentary sectional elevation of a part of the tabulating mechanism, taken as indicated by the line 3—3 in Figure 1;

Figure 4 is a plan view of the body of the machine with certain parts omitted and others shown in section, illustrating the drive arrangement and certain controlling connections in the machine;

Figure 5 is a rear elevational view of the machine with certain parts in section, the view being taken as indicated by the line 5—5 in Figure 1;

Figure 6 is a detailed view of certain parts shown in Figure 5;

Figure 7 is a perspective view of certain of the parts shown in Figure 5;

Figure 8 is a longitudinal view partly in section illustrating the clutch and certain parts of the shift and tabulating control, the view being taken as indicated by the line 8—8 in Figure 1;

Figure 9 is a sectional elevational view of the machine taken as indicated by the line 9—9 in Figure 1;

Figure 10 is a perspective view of certain of the shift control parts;

Figure 11 is a longitudinal elevational view with certain parts shown in section, the view being taken as indicated by the line 11—11 in Figure 1;

Figure 12 is a schematic operational view showing parts of the tabulating mechanism.

Figure 13 is a view similar to Figure 12 but showing the parts in a different operative position;

Figure 14 is a view similar to Figures 12 and 13 showing the parts as positioned near the end of a tabulating operation;

Figure 15 is a view similar to Figure 14 but showing the parts as positioned with the carriage entering its tabulated position;

Figure 16 is a side elevational view of the multiplier mechanism taken as indicated by the line 16—16 in Figure 1;

Figure 17 is a similar view to Figure 16 but has certain parts omitted to illustrate details of construction;

Figure 18 is an elevational view with certain parts in section, the view being taken as indicated by the line 18—18 in Figure 1;

Figure 19 is an operational view of the multiplier mechanism representing the condition of the parts with the multiplier key depressed to start a multiplying operation;

Figure 20 is a view of the parts similar to Figure 19 but showing the parts as positioned near the end of a multiplying operation;

Figure 21 is a detailed view of a part of the shift control mechanism taken as indicated by the line 21—21 in Figure 5;

Figure 22 is a detailed view of certain parts of the shift control mechanism taken as indicated by the line 22—22 in Figure 5;

Figure 23 is a schematic rear elevational view of the shift control mechanism;

Figure 24 is a detailed view of part of the shift control mechanism taken as indicated by the line 24—24 in Figure 23.

The invention is disclosed as embodied in a calculating machine having actuating mechanism of the uni-directional, continuous drive cycle type wherein all power driven operations are effected by engagement and disengagement of a single clutch providing the only path of power flow from the motor of the machine to the motor driven parts thereof. A calculating machine of this construction is disclosed in the copending applications of Carl M. Friden, Serial No. 42,268, filed September 26, 1935, which matured into Patent No. 2,310,281, dated February 9, 1943, and Anthony B. Machado, Serial No. 409,955, filed September 8, 1941.

The frame of the machine includes a base 10 (Figure 2) on which left and right side frame plates 12 and 13 are mounted within casing 11. Side plates 12 and 13 may be connected by cross brackets 16, 17, 18 and 19 (Figures 2 and 4) which serve to support various mechanisms of the machine. The register carriage 22 (Figures 1 and 2) which supports the accumulator and the revolutions counter is suitably mounted on the frame brackets 16 and 19 for endwise shifting movement laterally of the machine in either direction to various ordinal positions as controlled by means described hereinafter.

Carriage 22 (Figure 2) includes a frame 31 on which the numeral wheel shafts 32 are journalled to carry numeral wheels 33 of conventional construction. Numeral wheels 33 have projecting twirler knobs 33a for manual setting thereof. To transmit increments of value to numeral wheels 33, each shaft 32 extends below the frame 31 and has a ten-tooth gear 34 which is actuated by means later described.

Accumulator resetting means

Means are provided on the carriage for resetting the numeral wheels 33 (Figure 2) to zero registration including means such as rack bar 41 mounted for endwise sliding movement in the carriage frame adjacent the upper end of the numeral wheel shafts 32 for cooperation with mutilated gears 42 carried by numeral wheel shafts 32. Adjacent gears 42 are axially offset to cooperate with the adjacent vertically offset racks formed on rack bar 41 in the usual manner. When rack bar 41 is moved from its normal position to which it is spring urged in the usual manner, it will engage the gear 42 of a numeral wheel 33 displaced from the zero position and reset the numeral wheel to such position. Rack 41 carries a handle 44 (Figure 1) for manual operation and may be connected to an actuating bar 43 for power operation. Bar 43 is suitably mounted for sliding movement on the carriage frame 31 and may be selectively coupled with rack bar 41. This mechanism is disclosed and claimed in the copending application of Carl M. Friden, Serial No. 240,269, filed November 14, 1938, which matured into Patent No. 2,294,083, dated August 25, 1942.

Drive, selecting, and actuating mechanisms

The values to be introduced into numeral wheels 33 are selected by means of a plurality of banks or orders of settable value keys 61 (Figures 1 and 2) of conventional construction. Keys 61 are mounted for endwise sliding movement and are adapted to be latched in depressed position by a latching bar 62 associated with each bank of keys 61 and adapted to be operated to release a depressed key by zero key 63 in each order. All of the orders of keys can be released simultaneously by the operation of a key releasing gate (not shown) extending along the front edge thereof in the usual manner.

The keys 61 (Figure 2) cooperate with selecting mechanism including spring urged selecting slides 68 mounted for endwise movement to position gears 69 selectively with respect to the stepped teeth of the associated actuating cylinders 70. Cylinders 70 for adjacent orders are mounted on actuating shafts 71 (Figures 2 and 4) having suitable bevel gear connections with a transverse drive shaft 72 which is suitably journaled in side plates 12 and 13.

Shaft 72 and shafts 71 are driven cyclically from motor 73 through clutch 74 (Figures 4 and 8) which may be driven by suitable gearing 75. Clutch control lever 79 is pivoted on side plate 13 to determine engagement or disengagement of the clutch by releasing or engaging the nose of dog 77 in the full cycle position thereon.

The number of increments transmitted to a gear 69 (Figure 2) by a cylinder 70 during cyclic operation of the clutch is transmitted to a square shaft 81 which carries each ordinal pair of gears 69 and extends rearwardly of the machine in the usual manner. Each shaft 81 carries a spool 82 having bevel gears 83 and 84 for cooperation with the aligned numeral wheel gear 34.

The engagement of gears 83 and 84 with gears 34 is controlled by strap 86 positioned between the gears and mounted by suitable arms 85 for rocking movement with shaft 87. Thus, rocking of shaft 87 determines transmission of said increments to the numeral wheels and also the direction of entering thereon. Any suitable control means such as plus key 88 (Figure 1) and minus key 89 may be provided for rocking the shaft 87 to cause positive and negative registration as shown in Patent No. 2,229,889, dated January 28, 1941. Shaft 87 may be centralized by a pair of spring-urged centralizing arms 91 (Figure 2) cooperating with a central stop 92 and engaging a pin 93 carried by one of arms 85.

Revolutions counter mechanism

The revolutions counter may comprise numeral wheels 51 (Figure 2) on shafts 52 which may be reset to zero by rack bar 53 similar to the rack bar 41 described above. Rack bar 53 carries handle 48 (Figure 1) for manual operation and may be selectively connected to actuating bar 43 as described in said Patent No. 2,294,083.

The numeral wheels 51 (Figure 2) are actuated by means of a conventional actuator 54 mounted on shaft 55 which is rocked from drive shaft 72 through a spring connection in a clockwise direction from the position shown in Figure 2 into operative engagement with the aligned numeral wheel 51, and then is translated axially to effect entry of the digit. This structure is disclosed and claimed in my copending application Serial No. 370,256, filed December 16, 1940. When no count is to be made, the clockwise rocking movement may be restrained by means of a neutralizing finger 56 (Figure 9) carried by a slide 57 guided on cross bracket 17 and pivotally connected to plus-minus gate or strap 86 to be controlled thereby. In the central neutral position of strap 86, finger 56 underlies arm 58 of the counter actuator and thereby blocks rocking movement thereof.

Carriage shift mechanism

The carriage can be shifted selectively in either direction by power driven means controlled by manually operable keys, and this mechanism is of conventional construction. Carriage 22 is provided with toothed shift rack 101 (Figures 2 and 5) along the rear side thereof for cooperation with shift pins 102 on shift gear 103. Shift gear 103 (Figures 4 and 5) can be rotated in either direction and receives one-half rotation for each rotation of the clutch referred to above. For this purpose the shift gear 103 is connected by suitable gearing 104 to respective gear sleeves 106, 107, the gearing being arranged so that the drive from gear sleeve 106 rotates gear 103 in one direction and the drive from sleeve 107 rotates gear 103 in the opposite direction. The respective gear sleeves 106, 107 (Figure 4) are slotted for engagement by toothed collars 108, 109 mounted slidably but non-rotatably on the rearward ends of adjacent actuating shafts 71.

The sliding movement of collars 108, 109 (Figure 4) is controlled through forks 110 by means of spring-urged rods 111, 112 which extend forwardly of the machine and abut similar depending arms 113, 114 carried by shaft 116 and sleeve 117 mounted thereon. Adjacent side plate 13 (Figures 4 and 9) shaft 116 and sleeve 117 have upstanding arms 118 and 119 operated by suitable rollers 123 on shift keys 121 and 122 so that selective depression of the keys controls the direction of carriage shifting.

To enable the power drive shift keys 121 and 122 (Figure 8) have respective pins 123 cooperating with lever 124 operatively connected by lever 126 to control contacts 127 of the motor drive, and connected by link 128 with clutch control lever 79. Thus, on depression of either of keys 121 or 122, the clutch is engaged and the motor circuit enabled.

From the foregoing, it is seen that the carriage can be shifted selectively in either direction.

*Tabulation and dividend entry*

The tabulating and dividend entering mechanism is of the type disclosed in the copending application of Carl M. Friden and Anthony B. Machado, Serial No. 315,986, filed January 27, 1940, for "Calculating machine," and operates to zeroize the registers as a preliminary to a division operation, and to effect entry of the dividend into the accumulator in any selected ordinal position which may be preset in accordance with the problem being solved, while suppressing the usual count made in the revolutions counter during entry of a number in the accumulator. After setting of the dividend into the keyboard, the only other operation necessary is the depression of the dividend control means or key, after which the machine automatically operates to perform the above described functions, the desired ordinal position of the carriage for entry of the dividend having been preset in accordance with the number of quotient figures desired, or the desired position of the decimal point in the quotient.

The first operation which occurs upon depression of the dividend key is a shifting of the carriage to its leftmost position if displaced therefrom for a power clearance operation.

*Dividend or tabulating key.*—Referring to Figures 1 and 8, dividend key 141 is mounted for endwise sliding movement in side plate 13 by means of pin 142 engaging a slot therein. Spring 143 urges key 141 to the raised position shown in Figure 8. The lower end of key 141 is provided with elongated slot 144 which is engaged by pin 146 carried at the end of lever 147 mounted on transverse shaft 148 (Figures 4 and 8).

Intermediate its ends, key 141 (Figure 8) is provided with latching face 151 for engagement by the latching end of a latch slide 152 mounted for endwise sliding movement on side plate 13 with its rear end pivotally supported on upstanding pivotally mounted arm 153. Spring 154 is associated with arm 153 to urge slide 152 to latching position. Thus, upon depression of key 141 it is latched in depressed position, and it remains there until the end of the operation when delatching occurs by means described later.

Depression of key 141 serves to enable a shift of the carriage to the left, to enable a power clearance mechanism, to condition the shift to the right, to block out the counter actuator and to enable the drive.

The shift of the carriage to the left and the power clearance mechanism for the registers is enabled upon depression of key 141 (Figures 4 and 8) when the key operates through arm 147 to rock the shaft 148 in a clockwise direction as viewed in Figures 2 and 8. Referring to Figure 2, shaft 148 carries an upstanding arm 156 which is connected to a rearwardly extending pusher link 157 by an eccentric pivot 158. Pusher link 157 carries a pin 159 cooperatively related with depending arm 161 secured on transverse shaft 116. Shaft 116, as previously described, carries a depending arm 113 (Figure 4) which abuts the end of shift control rod 111 for the shift drive connection to the left. Thus, upon depression of the dividend key the shift drive connection determining shifting to the left will be engaged by the above described linkage.

To enable the power driven resetting mechanism, pusher link 157 (Figures 2 and 4) is provided with offset notched end 162 in operative pushing engagement with the end of control rod 163 for the power clearance drive. This engagement is maintained by the tension of spring 164 connected between pusher link 157 and arm 156. As seen in Figure 4, rod 163 extends rearwardly and carries control fork 166 for shiftable drive establishing collar 167 having a slidable but non-rotatable driving engagement with one of the actuating shafts 71, and being toothed for engagement with the slotted hub 168 of cam 169. As seen in Figure 5, cam 169 is operatively related with arm 171 to drive actuating slide 172 for power resetting, which in the leftmost position of the carriage is operatively related to arm 173 carried by actuating bar 43. The above described mechanism forms part of a conventional power return clearance mechanism as described in said Patent No. 2,294,083.

From the foregoing it will be seen that upon clockwise oscillation of shaft 148, as viewed in Figure 2, caused by depression of the dividend key, pusher link 157 operates to push rod 163 rearwardly against the tension of spring 174, and to thereby engage the drive connection between collar 167 and hub 168, so that power resetting will occur when the carriage is in its leftmost position. The shaft 148 may be operated through a suitable linkage by return clear key 176, to perform a combined clearing and carriage shifting operation to place the carriage in its left hand position.

As previously stated, depression of the dividend key 141 also serves to block out the counter actuator and prevent operation thereof, and to condition the shift mechanism for shifting to the right at the end of the return-clear operation.

As seen in Figures 8 and 9, the lower end of dividend key 141 is engaged in its uppermost position with a roller 181 carried by lever 182, pivoted at 183 on side plate 13. Lever 182 carries a roller 184 (Figure 9) operatively disposed beneath the forwardly extending arm 185 of a bellcrank 186 (Figure 7) pivoted on shaft 187, which is suitably mounted on side plate 13. The movement of bellcrank 186 is utilized to block the counter actuator from operation and also to condition the shift mechanism for shifting the carriage to the right at the end of the return-clear operation.

In order to block out the operation of the counter actuator by movement of the bellcrank 186 (Figure 9), the upright arm 188 of the bellcrank 186 carries a pin 189 operatively engaged with lever 190, pivoted at 191 on side plate 13. The upper end of lever 190 is pivotally connected at 192 with blocking slide 193 having projection 194 lying normally out of the path of oscillation of arm 58 of the counter actuator assembly.

Counterclockwise rocking movement of bellcrank 186 operates through lever 190 to move the slide 193 and projection 194 thereof from the position shown in Figure 9 to that shown in Figure 14, where movement of the counter actuator to active position is prevented as previously explained in connection with the neutralizer slide 51.

In order to condition the shifting mechanism for tabulation to the right, arm 196 (Figures 5, 7 and 12) is formed integrally with bellcrank 186 and is pivotally connected at 197 to a link 198 extending rearwardly and riding on roller 199 on an arm 201 (Figures 5, 10 and 12) also pivoted on shaft 187. Arm 201 has an arm 203 connected thereon and is connected thereto by spring 202 so that arm 203 is biased to move with arm 201. Shift engaging arm 203 has a curved upper end 204 operatively engaged with shift controlling fork 110 of the right hand shifting mechanism. Link 198 is adapted to be disposed between the roller 199 and a lever 206 (Figures 5 and 12) pivoted at 207 on bracket 16. Upright end 208 of lever 206 has slotted engagement with a stud 209 on bracket 16 and is spring-urged upwardly by spring 211.

In order to establish a driving relation between the lever 206 and arm 201, link 198 is provided with a raised portion 212 which normally is disposed out of the path of the lever 206, as shown in dotted lines in Figure 12, but is moved into the position shown in Figure 13 upon depression of the dividend key, so that when the lever 206 is subsequently depressed, as later described, arm 201 is rocked to operate through spring 202 (Figure 13) to place a bias on arm 203 to engage the shift clutch for determining shifting or tabulation to the right as later described.

The dividend key 141 also engages the clutch and enables the motor circuit. It will be recalled that shaft 148 (Figure 9) is rocked in a counterclockwise direction upon depression of the dividend key, and during such movement a depending arm 216 serves through its pin 217 to rock an arm 218 pivoted at 219 on side plate 13, and having an upstanding finger 221 operatively related with roller 222, carried at the lower end of lever 126 (Figures 8 and 9). Upon counterclockwise movement of arm 218 (as viewed in Figure 9) lever 126 (Figure 8) will be rocked in a counterclockwise direction to close contacts 127, and to operate through lever 124 and link 128 to move clutch control lever 79 from the position shown in Figure 6 to its clutch engaging position out of engagement with the clutch dog 77.

Thus upon depression of the dividend key 141, the first operation which ensues is a shifting of the carriage to its leftmost position if displaced therefrom, where a clearing or resetting operation is performed on either or both of the accumulator and counter. The clearing of the registers occurs during a cycle of operation with the carriage in its leftmost position, as shown in Figure 5, where one of shift pins 102 is engaged in the endmost tooth space of shift rack 101, which is formed in part by pawl 226, pivoted at 227 on the rack and urged against pin 228 by spring 229. With the carriage in the position shown, shift pin 102 during the clearing cycle, rotating in a clockwise direction serves to oscillate pawl 226 so that its extension 230 strikes end 208 of lever 206, and moves it downwardly, and this movement is utilized to initiate shifting of the carriage to the right to the selected position for entering the dividend.

At the beginning of the clear cycle, the parts are positioned as shown in Figure 12, where interponent arm 198 has its projection 212 disposed between the end 208 of lever 206 and roller 199 on shift conditioning arm 201. Thus, when pawl 226 moves downwardly, lever end 208 is depressed from the position shown in Figure 12 to that shown in Figure 13, when lever 201 operates through spring 202 to place tension on shift engaging arm 203. The movement of shift engaging arm 203 from the position shown in full lines in Figure 13 to that shown in dotted lines is delayed until the end of the cycle by interlock means associated with the shift engaging mechanism.

Referring to Figures 4 and 5, the interlock means comprises lever 231, pivoted at 232 on rear frame bracket 16, and having a pair of upstanding pins 233 spaced from and disposed in the path of respective shift forks 110 carried by rods 111 and 112. As seen in Figure 4, when one shift fork is moved rearwardly to engage the corresponding shift drive connection, the opposite pin 233 moves into blocking engagement with the other shift fork 110 to prevent operative movement thereof until the other shift drive is disengaged. Inasmuch as the shift drive for determining shifting to the left remains engaged until rocking of pawl 226 during the clear cycle, initiation of the shift to the right by movement of shift rod 112 by the hooked end 204 of arm 203 cannot occur until the end of the resetting cycle.

During the resetting cycle, certain other conditionings are effected in the machine. As seen in Figures 5, 9 and 10, arm 201 has integrally formed therewith a bellcrank 236 and both arm 201 and bellcrank 236 are urged to the position shown in Figure 12 by spring 237 attached to arm 203 and to the frame. The movement of the bellcrank 236 with arm 201 from the position shown in Figure 12 to that shown in Figure 13 is utilized to condition the control for entering the dividend at the end of the shifting operation to the right, and for maintaining the shift engaged until the selected tabulated position is reached.

To latch the bellcrank 236 and arm 201 in the position shown in Figure 13, the lower horizontal arm of bellcrank 236 is provided with laterally extending ear 238 adapted for engagement with a seat in a latch lever 239, pivoted at 241 on side plate 13, and urged in a clockwise direction by spring 242. As shown in Figure 13, upon clockwise movement of arm 201 and bellcrank 236, they are latched in position by latch lever 239.

The movement of bellcrank 236 also serves to condition means for engaging the plus-minus gears to enter the dividend at the end of the shift operation. For this purpose the upper arm of bellcrank 236 (Figure 12) is pivotally connected to a link 246, which is pivotally connected at 247 with a depending arm 248 pivoted to an actuating slide 249 mounted for vertical sliding movement on side plate 13, by slotted engagement with respective pins 251. As shown in Figure 12, depending arm 248 is normally to one side of an ear 252 of an arm 253 which forms part of a control to determine engagement of the plus-minus gears for entry of a dividend. Arm 253 (Figures 5, 8 and 14) is pivoted on shaft 187 and has integrally formed therewith an arm 254 carrying a roller 256 abutting a latch lever 257 pivoted on side plate 13 and urged in a clockwise direction by spring 258. As shown in Figures 13 and 14, arm 248 is operatively related to ear 252 so that downward movement of slide 249 will operate arms 253 and 254 to release latch lever 257 as later described.

The movement of lever 206 and end 208 thereof during the resetting operation also determines release of the shift connection determining shifting to the left. For this purpose, bellcrank 261 (Figures 5 and 9) is pivoted on shaft 87 and has one arm disposed beneath end 208 of lever 206. The depending arm of bellcrank 261 is pivotally connected to link 262 which has its forward end pivotally connected to depending arm 263 secured on transverse shaft 264 (Figures 4 and 9). Shaft 264 (Figures 2 and 4) carries an arm 266 which is slotted at its offset end to receive pusher link 157. Thus, counterclockwise movement of the bellcrank 261, as viewed in Figure 9, moves link 262 forwardly to rock shaft 264 in a counterclockwise direction (in the clockwise direction as viewed in Figure 2) so that arm 266 lifts pusher link 157 against the urgency of spring 164 to move end 162 thereof out of engagement with push rod 163 for the clear mechanism, and to disengage pin 159 from arm 161 of the control means for determining shifting to the left. In this manner, both the shift connection for left hand shifting and the drive connection for resetting are disabled during the cycle performing the resetting operation so that they can be disengaged near the end of such cycle.

Tabulation control

It will be recalled that when the right hand shift mechanism is acting as shown in Figure 13 by the dotted line position of shift control fork 110, the control linkage therefor is latched in operative position by the engagement of latch 239 with bellcrank 236, and also that arm 248 carried by actuating slide 249 is in operative position to release bellcrank 293. A tabulation control is provided for effecting this release selectively in any shifted position of the carriage, so that the dividend will be entered in such position. Alternatively, as later described, the carriage may be tabulated to the selected position, without entry of the dividend.

As seen in Figures 1, 2 and 3, the carriage 22 is provided with a series of tabulator keys 271, 272 numbered 0 and 2 to 9. In the first or leftmost position of the carriage zero tabulator key 272 is aligned with arrow 273 on the casing of the machine. Tabulator keys 271, 272 are mounted for vertical endwise movement in broached slots in carriage frame bar 274, and keys 271 can be latched in depressed position by spring urged latching slide 276 (Figures 2 and 3) which is adapted to engage over the tooth 277 of a depressed key. Zero key 272 provides a release key for any depressed key 271 which it may be desired to release in changing the setting of the machine to cause positioning of the carriage in its rightmost position. In alignment with the "10" key 271, a suitable fixed cam (not shown) is provided on the carriage which operates arm 282 (referred to hereinafter) irrespective of the depression of "10" key 271. Thus, "10" key 271 is a dummy key provided merely for the operator's convenience. Latching slide 276 is maintained in position in the frame bar 274 by retaining bracket 278. Keys 271 and 272 are urged to their raised positions by respective springs 279 associated therewith.

A depressed key 271, as indicated in dotted lines in Figure 3, is adapted to engage a V- shaped laterally extending ear 281 of an arm 282, pivoted at 283 on frame bracket 19. As shown in Figure 3, in the leftmost position of the carriage, release key 272 is aligned with the extension 281, and correspondingly, if the carriage is displaced one or more ordinal spaces from its leftmost position, the corresponding key 271 will engage the nose 281 and depress the arm 282. Adjacent its end, arm 282 (Figures 3 and 14) carries roller 284 which is disposed above the upper end of actuating slide 249. Thus, when the carriage shifts into a predetermined position, the actuating slide 249 is operated to move latch 239 from the position shown in Figure 14 to that shown in Figure 15, to release bellcrank 236 and arm 201 and thereby permit disengagement of the shift mechanism for shifting the carriage to the right. This operation will occur toward the end of the last shift cycle.

The downward movement of actuating slide 249 as the carriage enters its selected position also serves to release spring actuated means for meshing the plus-minus gears, and for releasing the dividend key. The downward movement of slide 249 (Figure 14) acts through interponent arm 248 and arms 253 and 254 to rock latching arm 257 in a counter-clockwise direction and thereby move its latching notch 291 out of the path of offset ear 292 of a bellcrank 293 pivoted on pin 294 on side plate 13. Bellcrank 293 is urged in a counterclockwise direction by a relatively strong spring 296 (Figure 8) and has its upper end formed as a cam nose 297 for operative engagement with a roller 298, carried at the lower end of a lever 299 connected by a clutch 321—322 (Fig. 5) to shaft 87, so that when lever 299 is rocked plus-minus gate 86 (Fig. 2) will be rocked therewith prior to the dividend entering cycle, when the amount set up in the keyboard will be entered as the dividend in the selected tabulated position of the carriage.

Movement of lever 299 also serves to actuate latch slide 152 (Figure 8) and thereby release the dividend key. It will be recalled that the dividend key serves to hold counter blocking slide in active position, and means is brought into play to prevent movement of counter blocking slide 193 out of active position when the key is released. For this purpose the offset ear 282 (Figure 15) of bellcrank 293 moves downwardly in front of offset ear 301 on lever 190, and maintains slide 193 in the position shown in Figure 15 during entering of the dividend.

The movement of bellcrank 293 which initiates the dividend entering operation also enables means for restoring such bellcrank to inoperative position. As shown in Fig. 11, the lower end of bellcrank 293 is connected by link 306 with an arm 307 pivoted on plate 300 and having its upper end normally disposed out of the path of a roller 308, carried by a gear 309 on the transverse shaft 72. However, counterclockwise movement of bellcrank 293 serves through link 306 to move arm 307 into the path of roller 308, so that near the end of the dividend entering cycle of operation after entry of the dividend into the accumulator, roller 308 rocks arm 307, and through link 306 oscillates bellcrank 293 in a clockwise direction so that latch 257 can again move to active position as shown in Figure 14. The return of bellcrank 293 also moves tooth 292 thereof out of engagement with tooth 301 so that lever 190 and link 193 can return to inactive position, as shown in Fig. 9. Arm 307 (Fig. 11) carries pin 311 normally positioned centrally of slot 312 in link 313 which is pivoted on pin 314 carried by link 128 (Fig. 8) of the drive controlling linkage. Movement of arm 307 clockwise in Fig. 11 positions pin 311 in the right hand end of slot 312 to thereby maintain the parts in drive establishing relation irrespective of release of key 141 in an early part of the cycle.

Tabulation without dividend entering

If desired, a control may be set whereby the carriage may be tabulated to a selected position without entering of the dividend, for example, if the amount set in the keyboard is to be used as a constant divisor and the dividend is set in the accumulator by means of twirlers 33a. As seen in Fig. 5, lever 299 is not directly secured to shaft 87, but is provided with a hub 321 having a clutch connection with a second clutch element 322 secured on shaft 87. Clutch elements 321 and 322 are normally urged apart by spring 323, but are held in engaged position by the lever 324, pivoted at 325 to bracket 295. The lower end of lever 324 is held in the position shown by roller 327 on double arm lever 328 (Figures 5 and 11) pivoted on side plate 13. Lever 328 may be suit- (Figure 16) carries pin 408 at its lower end for cooperation with the associated selecting arm 409, which has its lower end pivoted on strap 410 secured on multiplier plate 402. Each arm is pivotally connected intermediate its ends to one of selecting stop links 411 which extend rearwardly of the machine between multiplier plate 402 and retaining strap 412 suitably secured in spaced relation thereon. Springs 413 are tensioned between strap 412 and links 411 and serve to urge links 411 to the inoperative positions thereof illustrated in Figure 16, with arms 409 engaging pins 408 on the multiplier keys.

Adjacent their rear ends each link 411 carries a flanged stud 414 which engages in a corresponding guide slot formed in the arcuate forward edge of guide plate 416, which is suitably secured in spaced relation from multiplier plate 402. As seen in Figure 17, each link 411 has beveled stop end 417, and ends 417 are positioned in an arc for cooperation, when projected to active position, with a multiplier rack as described hereinafter.

From the above description, it appears that depression of a multiplier key 401 serves to rock 437 and link 434 downwardly thereby rocking lever 431 and pawl 428 to release multiplier rack 421. This condition is illustrated in Figure 19 where rack 421 is shown in full lines as positioned with the "one" key depressed, and in dotted lines as positioned with the "eight" key depressed.

The movement of multiplier rack 421 from its inactive position shown in Figure 17 serves to release power-operated means for setting the plus-minus gears to "plus" position, for engaging the clutch, for enabling the shift mechanism, for enabling the multiplier key latch release means, and for enabling the various interlocks. Preferably, such power operated means comprises a spring-pressed restrained element or bellcrank 441 (Figures 16 and 17) pivoted at 442 and urged in a clockwise direction by comparatively strong spring 443. Bellcrank 441 is restrained by the engagement of horizontal arm 444 thereof with roller stud 446 on rack 421. Upon movement of rack 421 to active position, bellcrank 441 moves under the influence of spring 443 from the position shown in Figure 17 to that shown in Figure 19.

To set the plus-minus gears by movement of bellcrank 441, the vertical arm 447 thereof has its upper bent end operatively related with, but slightly spaced from stud 448 of arm 449 which is secured on shaft 87. As heretofore described, rocking of shaft 87 controls the position of the plus-minus gears. As seen in Figure 17, arm 447 is spaced from stud 448 a sufficient distance to permit movement of shaft 87 and arm 449 in setting the machine for subtraction. It is also seen that clockwise movement of bellcrank 441 serves through arm 447 thereof and arm 449 to rock shaft 87 so that plus gears 83 (Figure 2) are meshed with numeral wheel gears 34. To engage the clutch, vertical arm 447 (Figure 16) of bellcrank 441 carries pin 451 (Figures 16 and 18) which extends through multiplier plate 402 and engages in the slotted rear end of link 452 (Figure 18) having its forward end pivotally connected to arm 453 pivotally mounted on plate 402. Arm 453 carries pin 454 which abuts link 313 (Figure 11) carried by pin 314 on clutch control link 128 (Figure 8). As previously described, the clutch is engaged and the motor energized by rearward movement of link 128.

To lock a depressed multiplier key in depressed position, rack 421 (Figure 16) is engaged by roller 456 on spring-urged bellcrank 457 pivotally mounted on plate 416. The forward end of bellcrank 457 underlies an end of an associated bellcrank 458 pivoted on strap 412. Bellcrank 458 has an ear 459 operatively related to slide 406. Upon depression of a multiplier key, rack 421 is released and bellcrank 457 becomes operative through bellcrank 458, to cause movement of slide 406 into locking engagement with the depressed key for the duration of the multiplying operation.

Upon engagement of the clutch, a step by step drive means for the multiplier rack becomes active to return the rack to normal or inactive position and one step beyond during the shift cycle of the actuating means, the next to last step being utilized to determine the shift and restore certain parts to normal, and the last step or shift cycle step being used to complete the normalizing operation. Also the latch pawl for the multiplier rack is normalized during the first step of movement.

The multiplier rack actuating mechanism includes actuating pawl 461 (Figure 17) pivoted at 462 on actuating arm 463 and having an offset tooth urged toward rack teeth 423 by spring 464 tensioned between pawl 461 and arm 463. Pawl 461 is maintained inactive or retracted by engagement of the inclined tail thereof with one of spacers 466. Arm 463 is pivoted at 467 on plate 402 and is apertured intermediate its ends to engage freely over shaft 422. During a multiplying operation, arm 463 is oscillated at each cycle of operation of the main actuating means by link 468 having one end pivotally connected thereto at 469 and having its other end selectively connected by L-slot 470 to pin 471 on cam follower 472. Follower 472 is pivoted at 473 on plate 402 and is urged in a clockwise direction by spring 474 secured thereto and to plate 402, to engage a roller 475 thereon with cam 476 secured on transverse clutch driven shaft 72. Thus, upon each cycle of operation of the actuating means, cam 476 (Figure 17) oscillates follower 472, such oscillation being idle as long as pin 471 registers with the horizontal portion of slot 470 where it is normally maintained by the urgency of spring 477 on arm 468. Upon movement of bellcrank 441 and link 452 to active position, pin 478 on link 452 rocks lever 479 which is pivoted at 481 on plate 402. The lower end of lever 479 carries a roller 482 overlying arm 468 to depress the arm at the beginning of a multiplying operation. In this way, pin 471 is engaged with the vertical portion of slot 470 to establish a driving relation between follower 472 and arm 468. Thus actuating arm 463 oscillates pawl 461 and effects a one step advance of rack 421 in a counter-clockwise direction during each cycle of a multiplying operation.

A holding pawl is associated with rack 421, such pawl being maintained disabled until one step of movement of the rack is completed. Holding pawl 486 (Figure 16) is pivoted at 487 on plate 416 and has an offset tooth extending therethrough into operative relation with teeth 423 of rack 421 under the influence of spring 488 connected between the holding pawl and plate 416. The holding pawl is normally disabled by engagement with surface 424 of rack 421. After setting of rack 421, the holding pawl is maintained disabled by arm 489 pivoted on plate 416 and having a shoulder at its lower end overlying the tooth pawl 486. Upon the first oscillation of actuating pawl 461, latch 489 is moved from above holding pawl 486 by pawl 461 and holding pawl 486 moves to active position.

As stated above, the first step of movement during multiplication also serves to reenable latching pawl 428 for rack 421. For this purpose, link 434 (Figures 16 and 17) is pivotally connected to link 491, which is also pivotally connected to spring-urged lever 492 pivoted on plate 402. At its upper end, lever 492 has a nose which in the full cycle position of the actuating means engages a complementary notch in cam disc 493 on cam 476. It will be noted that upon rotation of disc 493 from full cycle position, lever 492 is oscillated and through link 491, rocks link 434 to move the shoulder thereof from over offset end 432 of lever 431. Lever 431 is then free, with latch pawl 428, to return to normal position under the influence of spring 433, so that pawl 428 will engage face 426 of rack 421 when the rack is restored to its neutral inactive position at the of the operation.

During the next to last cycle of a multiplying operation, that is, the last value entering cycle, rack 421 engages bellcrank 441 to normalize certain parts of the mechanism and to condition the parts for a carriage shift, by cocking the shift control mechanism, such control mechanism being effective however only at the end of such next to last cycle. During the next to last step of movement of rack 421, roller stud 446 thereon engages and moves bellcrank 441 from the position shown in Figure 19 to that shown in Figure 20, where arm 449 and shaft 87 have moved back to neutral position so that plus gears 83 and numeral wheel gears 34 are disengaged. The disengagement of gears 83 and 34 is not effected, however, until after the value entering operation is completed. Figure 20 shows the parts during the next to the last cycle of any multiplying operation when pawl 461 is at its extreme active position. It is to be noted that at this time, bellcrank 441 has moved to a position which would permit movement of link 452 and arm 453 (Figure 18) to clutch disengaging position, such movement being prevented however by the engagement of pin 478 (Figure 20) with spring-urged latch lever 497 which maintains the engagement of the clutch during the shift cycle.

To enable the shift, arm 444 of bellcrank 441 carries pin 501 (Figures 17 and 18) which engages in the notched end of arm 502 (Figure 18) pivoted on plate 402. Live pawl 503 is pivoted at 504 on arm 502 and is urged counter-clockwise by spring 506. Pawl 503 has offset ear 507 which in the inactive position of the parts overlies the nose of arm 508 and is positioned above stop pin 509 on arm 502. Arm 508 is pinned on shaft 187 which is pivotally mounted in plate 402 and side plate 13 (Figure 5).

Before depression of a multiplier key, the parts are positioned as shown in Figure 18, the release of bellcrank 441 and its subsequent clockwise movement (as viewed in Figure 17) serving through pin 501 to move arm 502 downwardly from the position shown in Figure 18 so that pawl 503 snaps past the nose of arm 508 and against its stop pin 509 to position ear 507 below the nose. During the next to last step of movement, pin 501 moves arm 502 upwardly by virtue of the step of movement of bellcrank 441 under control of rack 421 to condition the machine for a one step shift of the carriage. Arm 502 through pin 509 and pawl 503 rocks arm 508 and holds the arm in rocked position until release of the parts during the last cycle as later described.

The movement of arm 508 and shaft 187 conditions and enables the shift mechanism to perform a one step shift at the end of the multiplying operation in the direction which has been selected by the conditioning of the machine, i. e., by the initial positioning of the carriage for a multiplying operation. Normally the multiplier shift control mechanism is conditioned to cause shifting of the register or accumulator carriage to the right but may be selectively adjusted to cause shifting thereof to the left. Shaft 187 (Figure 5) carries a slotted collar 511 which receives opposite similar teeth 512 of the hub of a shift-initiating arm 513. Arm 513 has double ended pin 514 secured in the upper end thereof for selective engagement with ear 516 or ear 516a of a pair of similar shift-initiating assemblies. Normally pin 514 is positioned in engagement with ear 516 as shown in Figure 5. Ear 516 (Figures 5 and 21) is formed on an arm 517 pivoted on shaft 187 and urged in a counter-clockwise direction as viewed in Figure 21 by spring 518. Arm 517 has a lever 519 pivoted thereon at 521 and urged in a clockwise direction by spring 522. The upper end of lever 519 engages behind fork 110 of the mechanism controlling shifting to the right.

With the parts positioned as shown in Figure 5, it is seen that rocking of shaft 187 and arm 513 during the next to last cycle of the multiplying operation serves to tension the spring 522 and thereby place a bias on shift initiating arm 519 whose upper end is urged against the associated shift fork 110. When the parts including collar 109 reach full cycle position at the end of such next to last cycle of the multiplying operation, spring 522 operating through shift-initiating lever 519 becomes effective to engage the shift drive and determine a carriage shift for one step to the right during the last cycle of the multiplying operation.

As explained, the position of the parts for right hand shifting at the end of multiplying operations are shown in Figure 5 where arm 513 is held against the urgency of spring 526 interposed between arm 513 and arm 517 by means of latch lever 527 (Figures 5 and 6) which engages downwardly extending ear 528 of arm 513. Latch lever 527 is pivoted at 529 on offset end 531 of arm 517 and is urged to latching position by spring 532.

The above condition of the parts obtains normally, i. e., at any time when the carriage is shifted to its leftmost position, when arm 513, if displaced from the position shown in Figure 5, will be restored thereto by means of lever 536 pivoted at 532 on the frame and having a pin 533 disposed in overlapping relation with arm 513. The upper end of lever 536 is bevelled for cooperation with a pin 538 carried at the end of a pivoted arm 539. The upper portion 539a of arm 539 is adapted for engagement by a pin 541 carried by the carriage in the leftmost position of the carriage. In this position, arm 539 is rocked to operate, through pin 538, arm 536 to move arm 513 to the position shown in Figure 5 if it is displaced therefrom.

Thus, when the machine is normalized by operating the return clear key so the carriage is returned to the leftmost position, the carriage shift in multiplication is conditioned for shifting to the right. If the machine is normalized by use of the tabulating key 141 to position the carriage in a tabulated position, then a control is exercised to cause setting of the multiplier shift mechanism for shifting to the left.

As seen in Figures 5 and 24, member 186 which is operated upon depression of the tabulating key 141 is provided with ear 541 which overlies the tail of latch 527 so that when a tabulation of the carriage to a position other than its leftmost position is determined, the latch 527 is released. When latch 527 is released, the spring 526 becomes effective to bring pin 514 into operative relation with ear 516a of lever 517a as shown in Figure 23. With this condition of the parts rocking of shaft 187 and arm 513 at the end of a multiplying cycle operates lever 517a and lever 519a carried thereby so that collar 110 for the left-hand shift mechanism becomes operative to control shifting in multiplication.

As noted above, the shift or last cycle of an ordinal multiplying operation is utilized to complete normalizing of the machine by restoring all active parts to neutral or inactive position. For this purpose, rack 421 is operated for an overstroke during the shift cycle to move bellcrank 441 and effect such normalizing operation. During this overstroke rack 421 and bellcrank 441 are moved away from and immediately returned to the position shown in Figure 16. Movement of bellcrank 441 during such overstroke serves through pin 501 (Figure 18) to lift arm 502 a sufficient amount to move pawl 503 above the nose of arm 508 to permit return of arms 508 and 513 to inactive position to release the bias of spring 522 (or spring 522a) of the shift control mechanism. At the same time, pawl 503 is relatched in the position shown in Figure 18.

To effect release of the clutch, upper arm (Figure 17) of bellcrank 441 carries roller 543, which upon the counterclockwise movement of bellcrank 441 during the shift cycle of the multiplying operation engages the adjacent end of lever 497 effecting counterclockwise movement thereof to release pin 478 on link 452, to permit return of the drive controlling means to inactive position. Locking bellcrank 458 (Figure 16) also is moved to release lock slide 406 and allow release thereby of the depressed multiplier key 401.

To summarize the operation of the directional shift control in multiplication when carriage is returned to its leftmost position (by return clear key 176, for example), the shifting operation after each ordinal multiplication will be to the right because arm 513 and its pin 514 are associated with the lever 517 and 519 as shown in Figure 5. If the carriage is moved by means of the tabulating mechanism to any other position, then shifting of the carriage after each ordinal multiplication will be towards the left-most position by virtue of the positioning of arm 513 and its pin 514 as shown in Figure 23.

I claim:

1. In a calculating machine having a shiftable carriage, a register in said carriage, actuating means for said register and means for shifting said carriage in either direction; multiplier mechanism including means for causing operation of said shifting means at the end of each ordinal multiplication, adjustable means for controlling the direction of operation of said shifting means in response to the control of said operation causing means, tabulating mechanism for controlling said shifting means to cause positioning of said carriage in any selected one of a plurality of positions, and means controlled by said tabulating means upon operation thereof for adjusting said adjustable means.

2. In a calculating machine having a shiftable carriage, a register in said carriage, actuating means for said register and means for shifting said carriage in either direction; multiplier mechanism including means for causing operation of said shifting means at the end of each ordinal multiplication, adjustable means for controlling the direction of operation of said shifting means in response to the control of said operation causing means, tabulating mechanism for controlling said shifting means to cause positioning of said carriage in any selected one of a plurality of positions, means controlled by said tabulating means upon operation thereof for adjusting said adjustable means to cause shifting of said carriage in one direction, and means controlled by said carriage when positioned in a predetermined position thereof for adjusting said adjustable means to cause shifting of said carriage in the other direction.

3. In a calculating machine having a shiftable carriage, a register in said carriage, actuating means for said register, and means for shifting said carriage in either direction; means for controlling said actuating means to cause registrations in said register including means for causing operation of said shifting means at the end of an ordinal registration, settable means for determining the direction of operation of said shifting means under control of said operation causing means, means controlled by said carriage in response to initial positioning thereof in an end position for setting said settable means to cause shifting of said carriage in one direction at the end of the ordinal registration, tabulating mechanism for controlling said shifting means to cause positioning of said carriage in a selected one of a plurality of positions, and means controlled by said tabulating means upon operation thereof for causing setting of said settable means to cause shifting of said carriage in the other direction at the end of the ordinal registration.

4. In a calculating machine, a shiftable carriage having an accumulator therein, means for shifting said carriage in either direction, means including a multiplier mechanism for controlling the registration of a product in said accumulator, a tabulating mechanism for positioning said carriage in a selectively predetermined ordinal position for entry of the highest order of the multiplier first, means actuated by said multiplier mechanism at the conclusion of the multiplying operation in one order for causing operation of said shifting means, and means actuated by said tabulating mechanism for determining the direction of operation of said shifting means at the conclusion of said multiplying operation, said direction of shift being to the left to position the carriage for entry of the next lower order of the multiplier.

CARL M. FRIDEN.